May 14, 1929.　　　　C. G. ENGLUND　　　　1,713,076
METHOD OF MAKING POINTING TOOLS
Filed Aug. 17, 1925
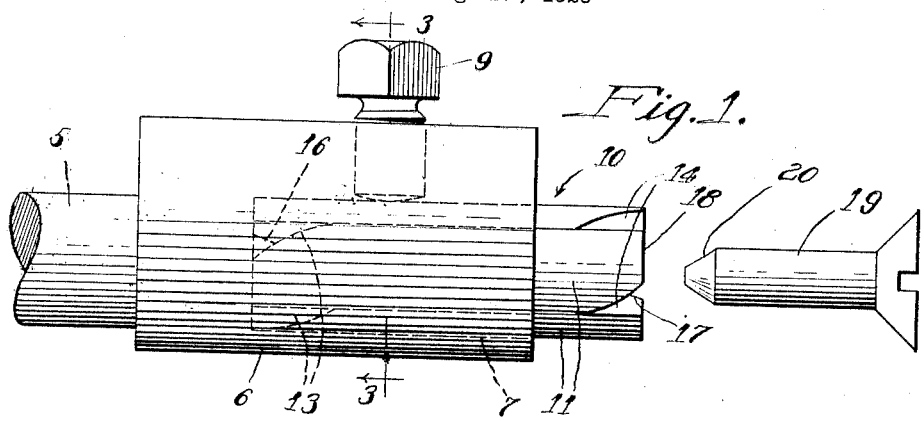
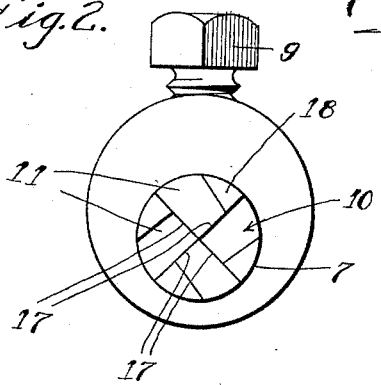
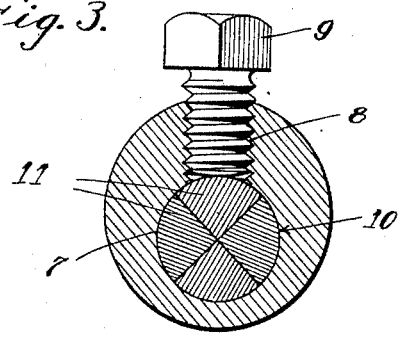
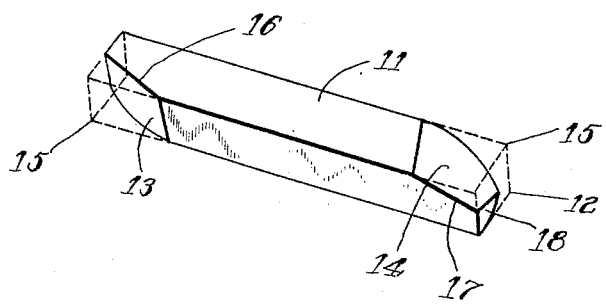
Inventor:
Carl Gunnar Englund
By Wilson + McCann
Attys.

Patented May 14, 1929.

1,713,076

UNITED STATES PATENT OFFICE.

CARL GUNNAR ENGLUND, OF ROCKFORD, ILLINOIS, ASSIGNOR TO ELCO TOOL AND SCREW CORPORATION, OF ROCKFORD, ILLINOIS, A CORPORATION OF ILLINOIS.

METHOD OF MAKING POINTING TOOLS.

Application filed August 17, 1925. Serial No. 50,541.

This invention relates to a pointing tool for pointing the ends of screws, bolts or the like and is particularly concerned with the novel method of making the same.

The principal object of the invention is to provide a pointing tool capable of use on a wider range of sizes or screws and bolts and wherein the cutting elements are reversible end for end and replaceable and interchangeable one for another.

A further object of the invention is to provide a pointing tool of a highly practical, simple and durable form which is economical to manufacture, and wherein the replacement or repair of parts may be made at little cost.

These and other objects of the invention will be brought out more clearly in the course of the following detailed description in which reference is made to the accompanying drawing forming a part hereof.

Fig. 1 is a side view on an enlarged scale of a pointing tool embodying the features of my invention and illustrating the operation performed thereby on a screw, for example;

Fig. 2 is an end view of the tool which more clearly illustrates the arrangement of the tool elements and the cutting edges thereof;

Fig. 3 is a cross section through the chuck taken on the line 3—3 of Fig. 1 looking in the direction of the arrows; and Fig. 4 is a perspective view of one of the four tool sections or bits of which the pointing tool is comprised. The dotted lines in this figure are for the purpose of illustrating more clearly the manner of producing the bits from the raw stock.

Pointing tools of the type heretofore commonly used ordinarily were so constructed as to be capable of pointing screws or bolts only of one certain size or, in certain instances, a small range of sizes could be accommodated. The pointing tool of the present invention is designed particularly with a view to making it possible to operate with one tool in the pointing of a much wider range of sizes of screws and bolts, it being contemplated that at least in the neighborhood of about twenty sizes of screws shall be accommodated by a single tool. A further impractical feature of previous types of pointing tools was that when they became worn it was necessary to discard and replace the same, it being impossible or impractical to replace the worn parts. The pointing tool of the present invention is designed to enable reversing the bits end for end when one or more bits become worn at one end. Further, the invention enables interchanging of one bit from one tool to another or replacing a single bit without the necessity of replacing more than one or all of the bits in a tool.

The tool comprises a spindle 5 having a chuck 6 thereon. The chuck 6 is preferably, although not necessarily, made integral with the spindle 5 and is illustrated as formed eccentric therewith. A tool socket or recess 7 is provided in the chuck 6 which is eccentric with reference to the chuck, and preferably concentric with respect to the spindle 5 in order to facilitate the setting up of the machine in an obvious manner. The eccentricity of the socket 7, with respect to the chuck, leaves a relatively thick wall on one side of the socket in which a threaded opening 8 is provided for the reception of a set screw 9 for clamping a pointing tool body designated generally by the reference numeral 10.

The tool body 10 is composite in form. That is, it is composed of four sections 11 all of which, as will presently appear, are of identical form both as to size and as to the provision of cutting edges thereon, these sections each having quarter-round segmental cross section as indicated in Fig. 3. In the producing of the tool body four pieces of square tool steel stock are assembled together to form a single square body, the body being turned down to a round cylindrical form thereby removing metal at the corners 12 of the sections as appears in dotted lines in Fig. 4. The four sections fit together as indicated in Figs. 2 and 3 and are chamfered at opposite ends as shown at 13 and 14, wedge shaped portions 15 indicated in dotted lines at opposite ends of the bit being ground off. The uniform cross section of the separate pieces enables interchanging and replacing of pieces when they become worn and have to be replaced or reground. Thus, it is possible to assemble the four bits in different relations one bit with respect to another, or bits may be interchanged from one tool to another. The chamfering produces cutting edges 16 and 17 extending at an acute angle with respect to the plane of the bit. The bits when assembled together have the cutting edges of adjacent bits in facing relation, all radiating from the center of the socket 7 and hence from the center of the tool body 10 and terminating at the center as indicated very clearly in Fig. 2. The flat end faces 18 are left in the chamfering off of the ends of the bits. These end faces abut the inner end of the socket 7 and serve to position the bits in proper relation in the chuck since all of the bits are of the same length.

In the use of the tool the spindle 5 is mounted in a movable stock for reciprocation toward and away from a stationary stock in which a screw blank 19 is releasably held in a rotating chuck. The spindle 5 is fed inwardly toward the projecting end of the blank 19 and the cutting edges 17 produce the pointed end 20 thereon. Obviously, the tapering of the point 20 may be carried out further than illustrated in Fig. 1 to produce a sharp point on the end of the screw by virtue of the fact that all of the cutting edges converge at the center of the tool body as above described. Any screw having a diameter within the limits defined by the ends of the cutting edges 17, where these edges meet the blunt faces 18, can be accommodated by the pointing tool illustrated. The convergence of the cutting edges to the center of the tool body enables operating on the smallest size of screws. After the pointing operation, it is common practice to thread the blanks, which is done after the pointing tool is retracted. Anywhere from 18 to 40 screws per minute are usually produced in this manner.

I claim:

1. The method of making a tool member for pointing or the like, made of four pieces of square stock, which consists in placing the pieces together to form a single composite square body, then machining the composite body to cylindrical form so that the separate pieces will have a quarter round cross section, and thereafter machining the pieces to provide an end cutting edge.

2. The method of making a tool member for pointing or the like, made of four pieces of square stock which consists in placing the pieces together to form a single composite square body, then machining the composite body to cylindrical form so that the separate pieces will have a quarter round cross section, and thereafter machining the pieces to provide an end cutting edge at opposite ends so that each of the four pieces of the composite tool body are interchangeable one with respect to the other as well as reversible end for end.

3. The method of making a tool of the character described made of a plurality of pieces of stock rectangular in cross-section, which consists in placing the pieces together to form a single composite body, then machining the composite body to cylindrical form so that each of the pieces has a rounded contour, and thereafter machining the ends of the pieces to provide cutting edges thereon.

4. The method of making a tool of the character described made of a plurality of pieces of stock rectangular in cross-section, which consists in placing the pieces together to form a single composite body, then machining the composite body to cylindrical form so that each of the pieces has a rounded contour, and thereafter beveling each of the pieces on one side at the end thereof.

5. The method of making a tool of the character described made of four pieces of stock, which consists in placing the pieces together to form a single composite body, then machining the composite body to cylindrical form so that the separate pieces have substantially a quarter round cross-section, and thereafter beveling off the ends of the separate pieces on one side.

6. The method of making a tool of the character described made of four pieces of stock, which consists in placing the pieces together to form a single composite body, then machining the composite body to cylindrical form so that the separate pieces have substantially a quarter round cross-section, and thereafter beveling off both ends of each of the pieces to provide cutting edges, the bevel being on one side at one end and on the other side at the other end whereby to make the pieces reversible end for end.

In witness of the foregoing I affix my signature.

CARL GUNNAR ENGLUND.